United States Patent
Kiebel et al.

(10) Patent No.: US 11,724,892 B2
(45) Date of Patent: Aug. 15, 2023

(54) ELECTRICALLY DRIVEN TURNOUT FOR A DUAL-BELT CONVEYOR

(71) Applicant: Robert Bosch GmbH, Stuttgart (DE)

(72) Inventors: Markus Kiebel, Stuttgart (DE); Steffen Kurz, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/658,419

(22) Filed: Apr. 7, 2022

(65) Prior Publication Data

US 2022/0348419 A1 Nov. 3, 2022

(30) Foreign Application Priority Data

Apr. 29, 2021 (DE) ...................... 10 2021 204 282.1

(51) Int. Cl.
*B65G 47/64* (2006.01)
*B65G 37/00* (2006.01)
(Continued)

(52) U.S. Cl.
CPC ......... *B65G 47/648* (2013.01); *B65G 37/005* (2013.01); *B65G 47/52* (2013.01);
(Continued)

(58) Field of Classification Search
CPC ........ B65G 47/74; B65G 47/71; B65G 47/52; B65G 47/648; B65G 37/005; B65G 47/766; B65G 13/10
(Continued)

(56) References Cited

U.S. PATENT DOCUMENTS 3,236,362 A * 2/1966 Hackbarth ........... B65G 47/766
 198/367
4,063,632 A * 12/1977 Neth .................... B65G 47/244
 198/374
(Continued)

FOREIGN PATENT DOCUMENTS

DE 20 2005 013 799 U1 1/2006
DE 20 2010 002 619 U1 8/2010
(Continued)

OTHER PUBLICATIONS

"Montech—Transfersystem LT40", Montech AG, retrieved Apr. 5, 2022 from https://www.youtube.com/watch? v=sNDoOjlFevl, Screenshots at 1:51, 2:10, 3:14 and 3:15, Mar. 27, 2017, (6 pages).
(Continued)

*Primary Examiner* — James R Bidwell
(74) *Attorney, Agent, or Firm* — Maginot, Moore & Beck LLP

(57) ABSTRACT

A turnout for use with two transport sections includes a turnout arm rotatably supported with respect to a first axis of rotation, guided linearly movably in the direction of the first axis, and movable between two end positions. The turnout arm has a deflection surface configured such that, when the turnout arm is in a first end position, a transported item can be transferred between the first and second transport sections via the deflection surface, and the turnout arm is located beneath the transport level in a second end position such that the transported item is movable along the first transport section beyond the turnout. The turnout arm is connected for driving, via a transmission, to a single electric motor such that it is movable back and forth between the first and second end positions solely by being driven by the electric motor in two degrees of freedom.

13 Claims, 4 Drawing Sheets

(51) Int. Cl.
  *B65G 47/74* (2006.01)
  *B65G 47/52* (2006.01)
  *B65G 47/71* (2006.01)

(52) U.S. Cl.
  CPC .............. *B65G 47/74* (2013.01); *B65G 47/71* (2013.01); *B65G 2812/02079* (2013.01)

(58) Field of Classification Search
  USPC ............................... 198/367, 370.07, 457.05
  See application file for complete search history.

(56) References Cited

U.S. PATENT DOCUMENTS

| | | | | |
|---|---|---|---|---|
| 4,653,629 | A * | 3/1987 | Born ..................... | B65G 47/683 198/452 |
| 5,029,693 | A * | 7/1991 | Williams ............... | B65G 13/10 198/370.09 |
| 5,452,786 | A * | 9/1995 | Gilmore ............... | B65G 47/766 198/367 |
| 6,837,359 | B1 * | 1/2005 | Bessette ................ | B65G 47/82 198/457.07 |
| 6,910,568 | B1 * | 6/2005 | Ydoate ................ | B65G 47/766 198/367 |
| 8,037,995 | B2 * | 10/2011 | Willi ..................... | B65G 35/06 198/465.1 |
| 11,350,794 | B2 * | 6/2022 | Esparza ................ | A47J 44/00 |
| 2005/0061091 | A1 | 3/2005 | Kato | |
| 2020/0397192 | A1 | 12/2020 | Esparza et al. | |

FOREIGN PATENT DOCUMENTS

| | | | |
|---|---|---|---|
| EP | 0 247 168 B1 | | 10/1989 |
| FR | 3 074 071 A1 | | 5/2019 |
| JP | 5221518 | * | 8/1993 ............ B65G 47/80 |
| JP | 2019-64794 A | | 4/2019 |

OTHER PUBLICATIONS

"Übersetzung (Technik)", Wikipedia Die freie Enzyklopädie, retrieved Apr. 7, 2022 from https://de.wikipedia.org/w/index.php?title=%C3%9Cbersetzung_(Technik)&oldid=209398682, Mar. 3, 2021 (5 pages).

"Transfer System LT40 Product Catalog", Montech AG, Jun. 2021, https://s3.eu-central-1.amazonaws.com/montech.com/app/uploads/sites/3/2021/10/20162755/Product-catalog-transfer-system-LT40-K-100002-2021_06-1623663091.pdf, (57 pages).

* cited by examiner

ELECTRICALLY DRIVEN TURNOUT FOR A DUAL-BELT CONVEYOR

This application claims priority under 35 U.S.C. § 119 to application no. DE 10 2021 204 282.1, filed on Apr. 29, 2021 in Germany, the disclosure of which is incorporated herein by reference in its entirety.

The disclosure relates to a turnout, and to a transport system comprising such a turnout.

BACKGROUND

In the video that was available on 17 Mar. 2021 at the internet address https://www.youtube.com/watch?v=sNDoOilFevI&t=8s, a turnout comprising a turnout arm can be seen from the playback time 1:51 minutes. In a second end position, the turnout arm is lowered beneath the transport level defined by the conveyor belts. In a first end position, it is raised above the transport level, being swiveled into a position in which the transported item, in the form of a workpiece carrier, is diverted from a first transport section to a second transport section.

SUMMARY

An advantage of the presently disclosed turnout is that the turnout arm can be moved purely electrically, in particular without compressed air. The entire drive is realized in a particularly simple and cost-effective manner. The electric drive can be controlled particularly easily, with neither a frequency converter nor a servo controller being required.

According to the disclosure, it is proposed that the turnout arm be connected in respect of drive, via a transmission, to a single electric motor in such a manner that it can be moved back and forth between the first and the second end position solely by being driven by the electric motor in two degrees of freedom coupled via the transmission. In the second end position, the entire turnout is preferably located beneath the transport level, such that no part of the turnout blocks the path of the transported item. The traction means is preferably in each case a conveyor belt or a conveyor chain. The traction means is preferably carried by an assigned carrier that, most preferably, comprises at least one profiled body that extends with a constant cross-sectional shape along the traction means, or along the corresponding transport direction.

It may be provided that the transmission is designed to be self-inhibiting in the first end position, at least in respect of a linear movement of the turnout arm in the direction of the first axis of rotation. The weight force of the turnout arm is thus carried solely by the transmission, without the electric motor having to be supplied with current. As a result, overheating of the electric motor is avoided because it is only supplied with current for a short time, during the movement of the turnout arm. In respect of the rotary movement of the turnout arm, the first and/or the second transport section may form an end stop for the turnout arm. However, it is also conceivable for the transmission to form such an end stop.

It may be provided that the transmission is designed in such a manner that in the second end position it forms an end stop for the movement of the turnout arm along the first axis of rotation in the direction of the second end position. Thus, also in the second end position, the weight force of the turnout arm is supported solely by the transmission, such that the electric motor does not need to be supplied with current. In addition, the transmission may form an end stop for the rotary movement of the turnout arm in the direction of the second end position. In the second end position, the first, or the second, transport section preferably does not form an end stop for the rotary movement of the turnout arm, as this would be comparatively complex.

It may be provided that the electric motor is embodied as a stepper motor that is connected in respect of drive to the transmission via a toothed belt, the corresponding toothed belt drive being designed in such a manner that it effects a transmission ratio that is greater than 2. A stepper motor is particularly inexpensive and is easy to control. Nevertheless, a sufficiently large torque can nevertheless be generated by means of the proposed toothed belt drive. The end stops discussed above can be used to approach a defined initial position of the turnout arm. It is quite acceptable in this case for steps of the stepper motor to be skipped during the corresponding initialization travel. In the subsequent normal operation, the design according to the disclosure reliably prevents any such skipping of steps. Thus, in the simplest case, the turnout can be operated entirely without sensors for the position of the turnout arm, while still allowing precise positioning. The said gear ratio is preferably greater than 2.8. The gear ratio is preferably defined as the rotational speed of the electric motor divided by the (input) speed of the transmission. A gear ratio greater than one therefore corresponds to a gear ratio in the slow direction (https://de.wikipedia.org/wiki/% C3%9Cbersetzung_tTechnikII.

Because of the toothed belt, only a small degree of alignment accuracy is required between the electric motor and the transmission.

It may be provided that the transmission comprises a control roller that is mounted so as to be rotatable with respect to a second axis of rotation and that is connected in respect of rotary drive to the electric motor, where the control roller extends at least portionally with a constant cross-sectional shape along the second axis of rotation, the corresponding circumferential surface having, from the second axis of rotation, a control distance that varies along its circumference. The control distance accordingly defines the lift position of the turnout arm. Preferably, the control distance varies evenly and smoothly between the first and the second end position. The control roller is preferably fixedly connected to a toothed belt wheel of the toothed belt drive explained above.

It may be provided that the control distance is maximal in the first end position. The self-inhibiting effect in the first end position, explained above, is thus easily achieved.

Preferably, the control distance varies evenly and smoothly beyond the first end position. Thus, the slope of the control distance over the angle of rotation in the first end position is zero, such that particularly good self-inhibiting is provided. It is understood that the part of the circumferential surface of the control roller behind the first end position is not used in operation to move the turnout arm in the direction of the first axis of rotation.

It may be provided that the control distance is minimal in the second end position. Thus, the control roller forms the above-mentioned end stop in respect of a movement in the direction of the first axis of rotation. Behind the second end position, i.e. outside the circumferential portion of the circumferential surface that is used in operation, the control distance may be constant and equal to the minimal control distance. Outside the useful area of the circumferential surface, between the first and the second end position, the control distance preferably varies rapidly between its least and its greatest value.

It may be provided that the turnout arm is mounted on a separate carriage so as to be rotatable with respect to the first axis of rotation, the carriage being guided in a linearly movable manner in the direction of the first axis of rotation, a control surface of the carriage bearing on the circumferential surface of the control roller. The variable control distance is thus converted particularly easily into a lift movement of the turnout arm. The first axis of rotation is preferably aligned parallel to the direction of gravity, the circumferential surface of the control roller supporting a weight force of the carriage with the turnout arm via the control surface.

It may be provided that the control roller, in the region of the circumferential surface, has a control groove or a control projection that extends helically with respect to the second axis of rotation, the turnout arm being fixedly connected to a separate control arm that is coupled, at a free end, to the control groove, or to the control projection. It would also be conceivable for the turnout arm itself to form the control arm. On the other hand, the preferred additional control arm renders possible a particularly space-saving turnout arm. Furthermore, the control roller can be located in a favorable manner between the two profiled bodies of the first transport section, in particular if the distance between them is small.

It may be provided that the carriage comprises a base plate that is parallel to the transport level, the turnout arm and the control arm being located on opposite sides of the base plate. The control arm and the turnout arm are preferably fixedly connected to each other via a circular cylindrical axle portion, the axle portion being rotatably mounted on the base plate, most preferably by means of a plain bearing or a roller bearing. The base plate is preferably embodied as a flat plate of a constant thickness.

It may be provided that the first axis of rotation is located in the range of between 30% and 70%, preferably between 40% and 60%, of the length of the deflection surface in the direction of movement of the transported item. The first axis of rotation preferably passes through the turnout arm transversely in relation to the deflection surface, the exact location being largely freely selectable.

The disclosure also includes transport system comprising a first and a second transport section and a turnout according to the disclosure, at least the first transport section comprising two endlessly revolving traction means spaced apart in parallel, all traction means defining a common transport level, the first axis of rotation being perpendicular to the transport level, being located between the two traction means of the first conveying section.

It is understood that the above-mentioned features and those to be explained below can be used not only in the combination indicated in each case, but also in other combinations or on their own, without departure from the scope of the present disclosure.

BRIEF DESCRIPTION OF THE DRAWINGS

The disclosure is explained in greater detail in the following on the basis of the appended drawings, in which.

DETAILED DESCRIPTION

Figure 1:
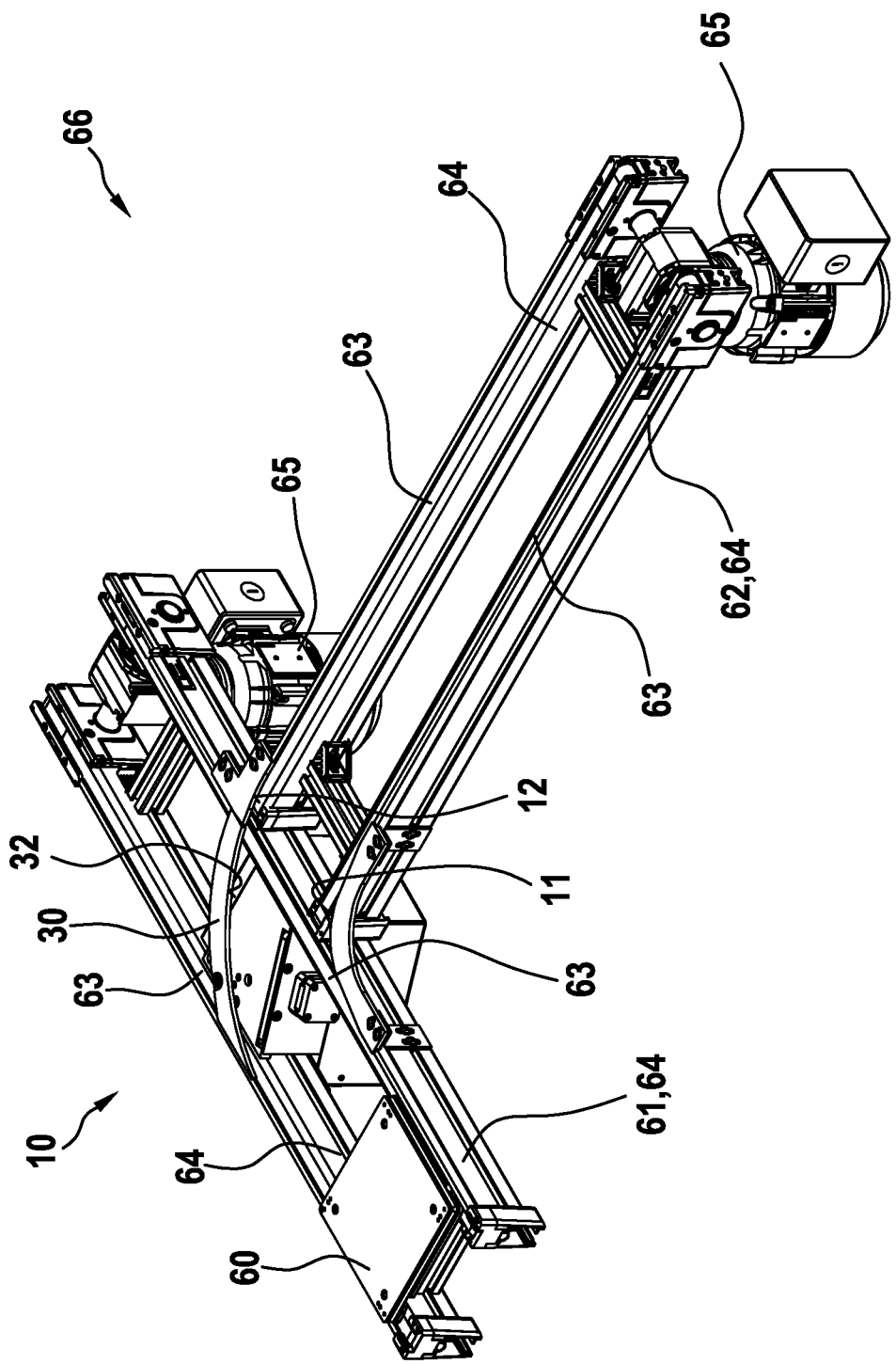
FIG. 1 shows a perspective view of a transport system comprising a turnout according to the disclosure, the turnout arm being in the first end position.

FIG. 1 shows a perspective view of a transport system 66 comprising a turnout 10 according to the disclosure, the turnout arm 30 being in the first end position. The transport system 66 comprises a first and a second transport section 61;62 that are attached to each other in a T-shape. Both transport sections 61;62 each have two endlessly revolving traction means 63, which are parallel to and spaced apart from one another, the upwardly facing surfaces of all traction means 63 being located in a common transport level. The traction means in this case are endless conveyor belts, each of which is movably held by an assigned carrier 64. The carriers 64 in this case are produced from extruded aluminum profiles. Both transport sections 61; 62 each have a traction-means drive 65 by which the two assigned traction means 63 can be set in motion synchronously. The traction-means drives 65 preferably each comprise an electric motor.

Preferably, transported item 60, in the form of workpiece carriers, is transported on the present transport system 66. In the simplest case, these may be flat plates of a constant thickness, which in turn carry workpieces (not represented) that are transported, for example, between different processing stations of a production line.

By means of the turnout 10 according to the disclosure, the transported item 60 shown in FIG. 1 can be transferred from the first transport section 61 to the second transport section 62. For this purpose, the turnout arm 30 is in the first end position shown in FIG. 1, above the transport level, it being swiveled into a position in which its curved deflection surface 32 extends over the entire width of the first transport section 61. The transported item 60 moved by the traction means 63 of the first transport section 61 is thus stopped by the deflection surface 32 on the turnout arm 30 and deflected towards the second transport section 62. As soon as the transported item 60 comes into engagement with the traction means 63 of the second transport section 62, the swivel movement of the transported item 60 is brought to an end by the corresponding drive forces.

To assist the swivel movement of the transported item 60 within the turnout 10, a curved inner guide surface 11 and a straight or slightly curved outer guide surface 12 are located in a fixed position on the transport system 66. In the first end position, the outer guide surface 12 continues the curved deflection surface 32 on the turnout arm 30 in an even and smooth manner. The corresponding component at the same time forms an end stop for the turnout arm 30.

Figure 2:
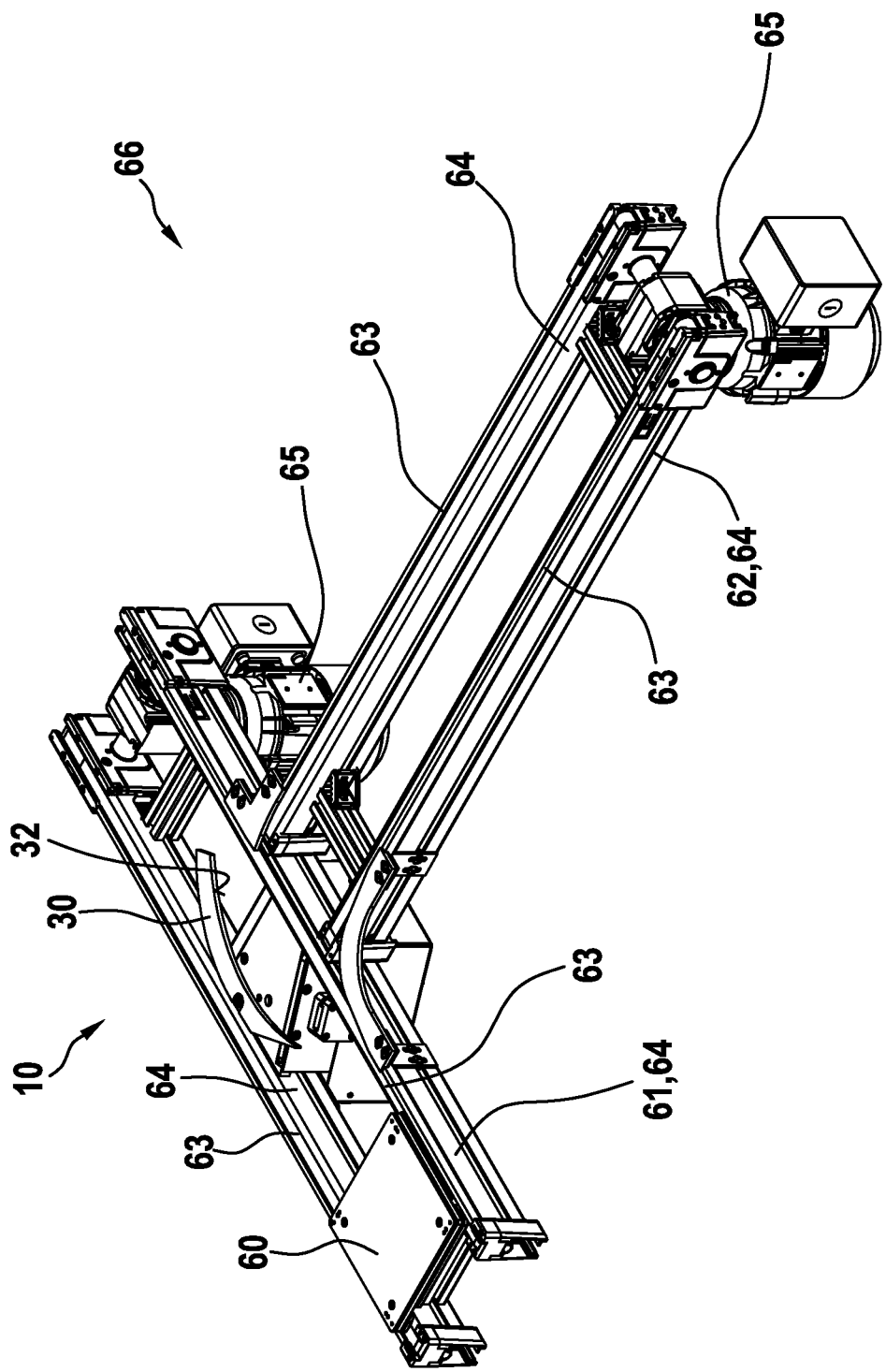
FIG. 2 shows the transport system according to FIG. 1, the turnout arm being in the second end position.

FIG. 2 shows the transport system 66 according to FIG. 1, the turnout arm 30 being in the second end position. The turnout arm 30 in this case is swiveled in such a manner that it located is entirely between the two carriers 64 of the first transport route 61, being located entirely beneath the transport level. The transported item 60 shown in FIG. 2 is thus moved in a straight line beyond the turnout 10 by the traction means 63 of the first transport section 61, and is not deflected towards the second transport section 62.

Figure 3:
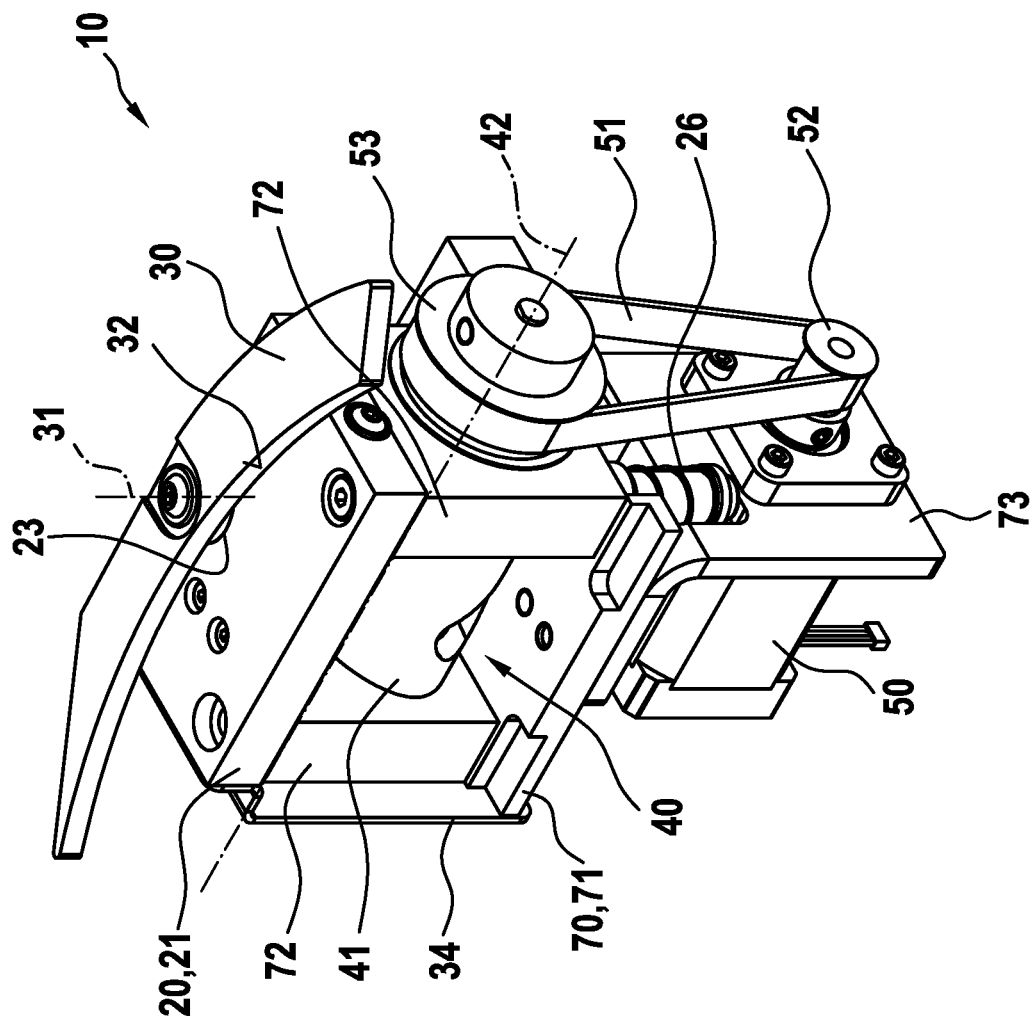
FIG. 3 shows a perspective view of the turnout of the transport system according to FIG. 1, without the surrounding housing.

FIG. 3 shows a perspective view of the turnout 10 of the transport system according to FIG. 1, without the surrounding housing. The turnout 10 comprises a base 70 that can be fixedly connected, in particular screwed, to the first transport section (No. 61 in FIG. 1). The base 70 in this case comprises a first base part 71, two second base parts 72 and a third base part 73 that are fixedly connected to one another, in particular screwed together. The first base part 71 is realized in the form of a plate, the two second base parts 72 being attached perpendicularly to the first base part 71, resulting overall in a U-shape. Extending through each of the second base parts 72 is an assigned circular cylindrical guide rod (No. 24 in FIG. 4), each of which is mounted in a linearly movable manner on the assigned second base part 72. The guide rods are fixedly connected, in particular screwed, to the base plate 21 of the carriage 20 at what in FIG. 3 is their upper end face.

Furthermore, the second base parts 72 each accommodate a rotary bearing (No. 46 in FIG. 4) in the form of a radial roller bearing, by which the control roller 41 is mounted in a rotatable manner with respect to the second axis of rotation 42. The control roller 41 in this case is located between the two second base parts 72, being held by the rotary bearings 46 so as to be immovable in the direction of the second axis of rotation 42.

The third base part 73 is an L-shaped, curved sheet metal part that is fastened, in particular screwed, to the underside of the first base part 71 by one L-leg. The other L-leg forms a flange to which the electric motor 50, in this case realized as a stepper motor is fastened. The drive shaft of the electric motor 50 is fixedly connected to a smaller first toothed belt wheel 52. The control roller 41 is fixedly connected to a larger second toothed belt wheel 53. The first and the second toothed belt wheel 52; 53 are connected in respect of rotary drive via a toothed belt, the corresponding transmission ratio being considerably greater than one, being for example three. The electric motor 50 thus rotates comparatively rapidly and with a low torque, the control roller 41 rotating slowly with a comparatively high torque. The control roller 41 is part of a transmission 40 that is explained in greater detail with reference to FIG. 4.

Also to be noted is the cover plate 25 on the carriage 20, which is part of the housing.

Figure 4:
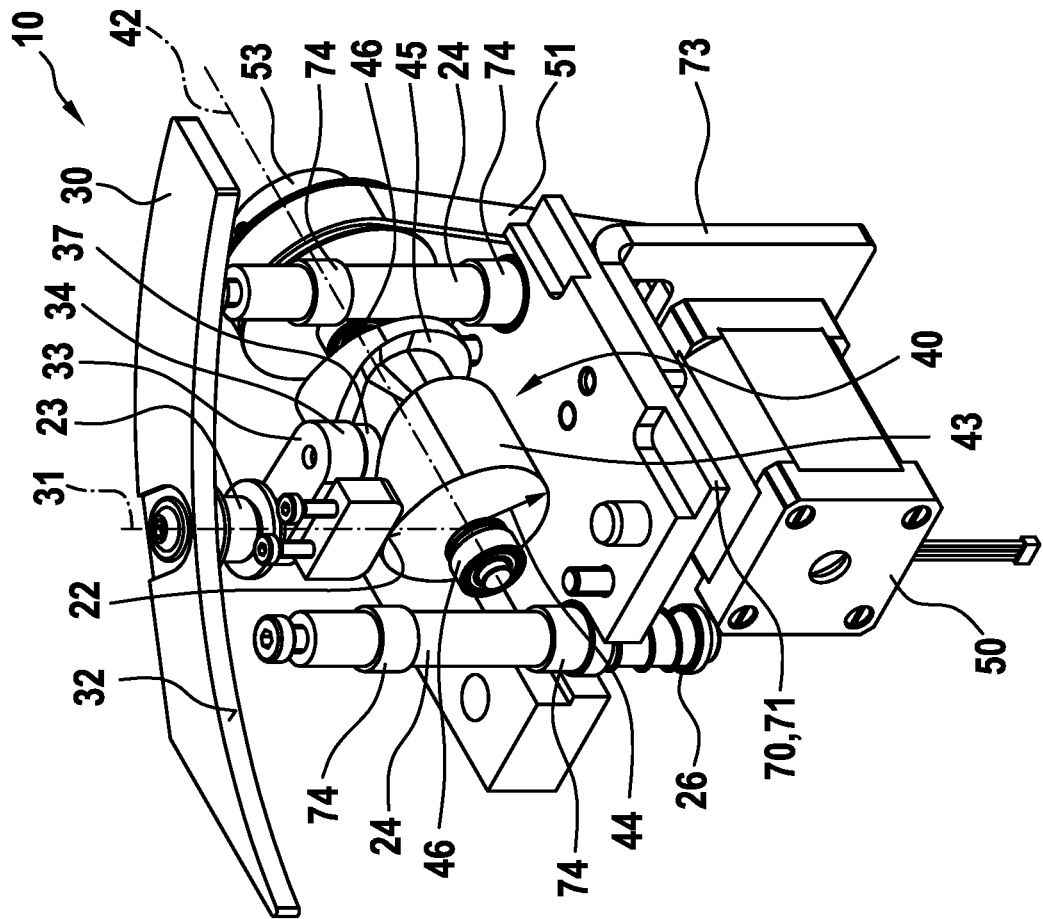
FIG. 4 shows a further perspective view of the turnout according to FIG. 3, with further parts having been omitted.

FIG. 4 shows a further perspective view of the turnout 10 according to FIG. 3, with further parts having been omitted, namely the base plate and the second base parts. This firstly reveals the rotary bearing 23 by which the turnout arm 30 is mounted so as to be rotatable with respect to the first axis of rotation 31. This rotary bearing is fixedly accommodated in the base plate (No. 21 in FIG. 3), and extending through it there is a circular cylindrical axle portion that connects the turnout arm 30 in a non-rotatable manner to a control arm 33. Accordingly, the turnout arm 30 and the control arm 33 are located on opposite sides of the base plate. The control arm 33 is provided at its free end 34, remote from the first axis of rotation 31, with a circular cylindrical control cam 37 that engages in the helical control groove 45 on the outer circumferential surface of the control roller 41.

FIG. 4 also shows the two circular cylindrical guide rods 24 by means of which the carriage is guided in a linearly movable manner in the direction of the first axis of rotation 31. The guiding is effected by means of respectively two sliding bushes 74, which are fixedly incorporated in an assigned second base part (No. 72 in FIG. 3). The ends of the two guide rods 24 that face away from the base plate are each surrounded by a helical spring 26 that biases the carriage in the direction of the second end position, such that the control surface 22 on the carriage is pressed against the circumferential surface of the control roller 41.

Apart from the control groove 45, the circumferential surface of the control roller 41 extends with a constant cross-sectional shape along the second axis of rotation 42. The cross-sectional shape is defined by a control distance 44, which varies along the circumference of the control roller 41. The control distance 44 at the control surface 22 of the carriage accordingly defines the lift position of the carriage. Rotation of the control roller 41 by means of the electric motor 50 therefore enables the determinative control distance 44 to be changed. When the control roller 41 is rotated, the location at which the control cam engages in the control groove 45 changes at the same time, such that the rotational position of the turnout arm 30 changes in turn. A rotation of the electric motor 50 thus simultaneously effects a lift movement and a swivel movement of the turnout arm 30, i.e. a movement in two degrees of freedom.

FIG. 4 shows the second end position of the turnout arm 30, in which the determinative control distance 44 at the control surface 22 is minimal. The control roller 41 thus forms an end stop for the downward movement of the carriage, such that the weight force of the carriage is supported by the control roller 41. The turnout arm 30 therefore remains in this position without the need for the electric motor 50 to be supplied with current. This reliably prevents overheating of the electric motor 50.

It is also to be noted that the first axis of rotation 31 is located approximately in the center of the turnout arm 30.

REFERENCE NUMERALS 10 turnout
11 inner guide surface
12 outer guide surface
20 carriage
21 base plate
22 control surface
23 rotary bearing
24 guide rod
25 cover plate
26 helical screw
30 turnout arm
31 first axis of rotation
32 deflection surface
33 control arm
34 free end of the control arm
37 control cam
40 transmission
41 control roller
42 second axis of rotation
43 circumferential surface of the control roller
44 control distance
45 control groove
46 rotary bearing
50 electric motor
51 toothed belt
52 first toothed belt wheel
53 second toothed belt wheel
60 transported item
61 first transport section
62 second transport section
63 traction means
64 carrier
65 traction-means drive
66 transport system
70 base
71 first base part
72 second base part
73 third base part
74 sliding bush

The invention claimed is:

1. A turnout for use with first and a second transport section, at least the first transport section including two parallel, spaced-apart, endlessly revolving traction elements, the two traction elements defining a common transport level, the turnout comprising:
    a turnout arm supported so as to be swivelable with respect to a first axis of rotation, guided in a linear movable manner in a direction of the first axis of rotation, and movable back and forth between a first and a second end position, the first axis of rotation being perpendicular to the transport level, locatable between the two traction elements of the first conveying section, the turnout arm comprising:
        a concavely curved deflection surface configured such that, when the turnout arm is in the first end position, a transported item can be transferred from the first to the second transport section or vice versa via the deflection surface, and when the turnout arm is in the second end position, the turnout arm is located entirely beneath the transport level such that the transported item is movable along the first transport section beyond the turnout;
    a single electric motor; and
    a transmission via which the turnout arm is connected to the electric motor such that the electric motor drives the turnout arm to move back and forth between the first and second end positions solely by being driven by the electric motor, via the transmission, in two degrees of freedom.

2. The turnout according to claim 1, wherein the transmission is configured to be self-inhibiting in the first end position, at least in respect of a linear movement of the turnout arm in the direction of the first axis of rotation.

3. The turnout according to claim 1, wherein the transmission is configured such that, in the second end position, the transmission forms an end stop for movement of the turnout arm along the first axis of rotation in a direction toward the second end position.

4. The turnout according to claim 1, wherein the electric motor is a stepper motor that is connected to the transmission so as to drive the transmission via a toothed belt, the toothed belt drive configured to effect a transmission ratio that is greater than 2.

5. The turnout according to claim 1, the transmission comprising a control roller that is mounted so as to be rotatable with respect to a second axis of rotation and that is connected to be rotationally driven by the electric motor, the control roller extending at least portionally with a constant cross-sectional shape along the second axis of rotation at which a corresponding circumferential surface has, from the second axis of rotation, a control distance that varies along a circumference of the circumferential surface.

6. The turnout according to claim 5, wherein the control distance is at a maximum in the first end position.

7. The turnout according to claim 5, wherein the control distance is at a minimum in the second end position.

8. The turnout according to claim 5, further comprising:
    a carriage on which the turnout arm is mounted so as to be rotatable about the first axis of rotation, the carriage being guided in a linearly movable manner in the direction of the first axis of rotation, and the carriage including a control surface that bears on the circumferential surface of the control roller.

9. The turnout according to claim 5, wherein the control roller, in a region of the circumferential surface, has a control groove or a control projection that extends helically with respect to the second axis of rotation, the turnout arm being fixedly connected to a separate control arm that is coupled, at a free end, to the control groove or to the control projection.

10. The turnout according to claim 9, further comprising:
    a carriage on which the turnout arm is mounted so as to be rotatable about the first axis of rotation, the carriage being guided in a linearly movable manner in the direction of the first axis of rotation, and the carriage including a control surface that bears on the circumferential surface of the control roller,
    wherein the carriage further comprises a base plate that is parallel to the transport level, and the turnout arm and the control arm are located on opposite sides of the base plate.

11. The turnout according to claim 1, wherein the first axis of rotation is located in a range of between 30% and 70% of a length of the deflection surface in a direction of movement of the transported item.

12. The turnout according to claim 1, wherein the first axis of rotation is located in a range of between 40% and 60% of the length of the deflection surface in the direction of movement of the transported item.

13. A transport system comprising:
    a first transport section comprising two endlessly revolving traction elements spaced apart in parallel such that the traction elements define a common transport level;
    a second transport section; and
    a turnout comprising:
        a turnout arm supported so as to be swivelable with respect to a first axis of rotation, guided in a linear movable manner in a direction of the first axis of rotation, and movable back and forth between a first and a second end position, the first axis of rotation being perpendicular to the transport level, locatable between the two traction elements of the first conveying section, the turnout arm comprising:
            a concavely curved deflection surface configured such that, when the turnout arm is in the first end position, a transported item can be transferred from the first to the second transport section or vice versa via the deflection surface, and when the turnout arm is in the second end position, the turnout arm is located entirely beneath the transport level such that the transported item is movable along the first transport section beyond the turnout;
        a single electric motor; and
        a transmission via which the turnout arm is connected to the electric motor such that the electric motor drives the turnout arm to move back and forth between the first and second end positions solely by being driven by the electric motor, via the transmission, in two degrees of freedom.

* * * * *